July 2, 1968 S. W. PICCIONE 3,391,306
SOLENOID POWER AMPLIFIER
Filed March 1, 1966
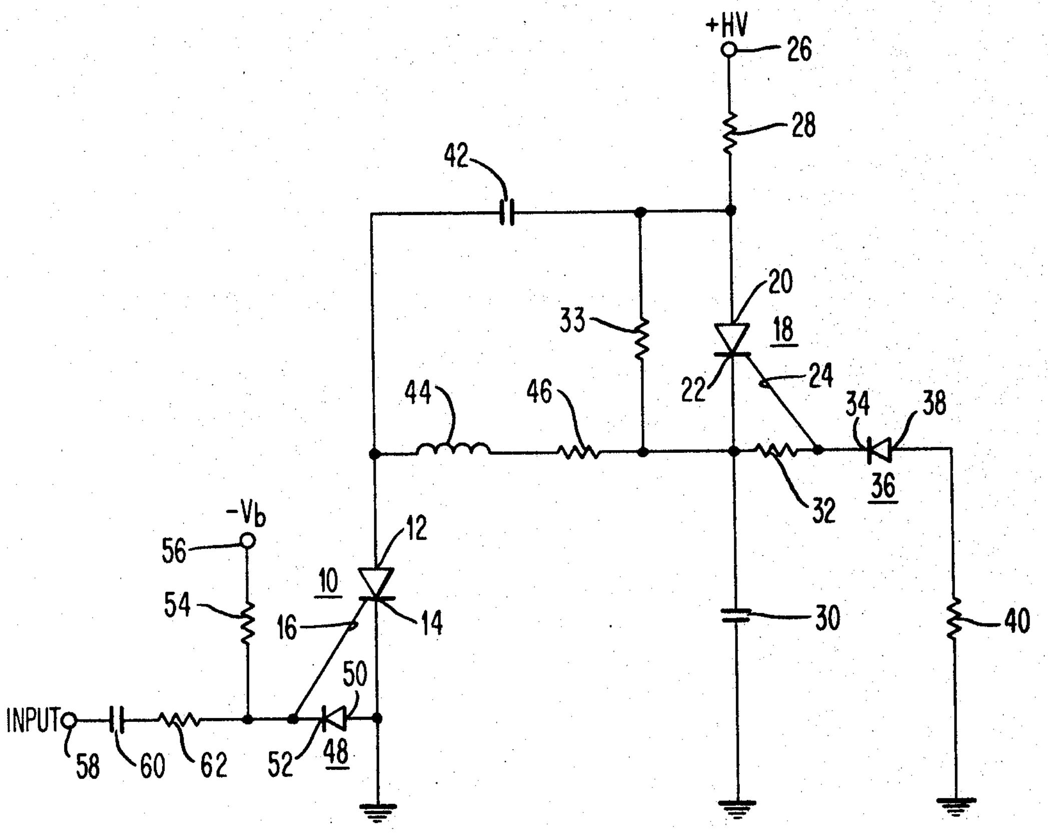
INVENTOR
SEBASTIAN W. PICCIONE
BY [signature]
ATTORNEY United States Patent Office 3,391,306

Patented July 2, 1968

3,391,306

SOLENOID POWER AMPLIFIER

Sebastian W. Piccione, Norristown, Pa., assignor to Sperry Rand Corporation, New York, N.Y., a corporation of Delaware Filed Mar. 1, 1966, Ser. No. 530,821
8 Claims. (Cl. 317—148.5)

This invention relates to solenoid power amplifiers and, in particular, to electrical means for actuating inductive loads, such as print hammer actuators.

Automatic data processing equipment, in general, utilize high speed pirnters as part of the overall system. To achieve high speeds, associated print hammers are activated at high repetition rates. Since there are, typically, 130 characters on one line of type, it is desirable that each of the print hammer actuators be operative in response to low power timing signals.

Solenoid power amplifiers of the prior art, generally, are relatively bulky in size. Most of the prior art devices contain large inductive chokes or coils in the activating circuit.

The trend of electronic data processing systems toward miniaturization, and toward compact design, creates a demand for a compact solenoid power amplifier that can be mounted, for example, on a printed circuit board.

Some amplifiers of the prior art are of the bistable type, wherein an input signal actuates the circuit and a separate reset signal returns the circuit to its original state. Inherently, a separate reset signal limits the repetition rate of the circuit.

Thus, it is the purpose of this invention to provide a novel solenoid power amplifier which is operative with only one signal, an input trigger signal, whereby resetting is automatically provided.

It is also a purpose of this invention to provide novel solenoid power amplifying means which is capable of high repetition rates and which eliminates the need for bulky components, such as inductive chokes.

Silicon controlled rectifiers (hereinafter termed "SCR's") are well known as circuit elements. In general, an SCR operates in a manner, using tube analogy, as a thyratron.

In accordance with one embodiment of this invention, two interconnected SCR's are utilized: an input SCR and a capacitor-charging SCR. An input signal is coupled to the gate electrode of the input SCR, the cathode of which is coupled to a point of reference potential, such as ground. The anodes of both SCR's are coupled together by a coupling capacitor. A large capacitive means is charged through the charging SCR, being coupled to the cathode thereof. The cathode of the charging SCR is coupled to the anode of the input SCR by means of the output load: the solenoid of the print hammer actuator.

Other objects and advantages of this invention, together with its construction and mode of operation, will become more apparent from the following description, when read in conjunction with the accompanying drawing, in which the sole figure is an electrical diagram of one embodiment of this invention.

Referring to the figure, there is shown an input SCR 10 having an anode 12, a cathode 14, and gate electrode 16. Also, there is shown a charging SCR 18 having an anode 20, a cathode 22, and a gate electrode 24.

A high voltage source is coupled to a voltage terminal 26. A resistor 28 connects the voltage terminal 26 to the anode 20 of the charging SCR 18. A large capacitive means 30 couples the cathode 22 of the SCR 18 to a point of reference potential, such as ground. A charging resistor 33 is coupled across the anode 20 and cathode 22 of the SCR 18.

A biasing resistor 32 is coupled between the gate electrode 24 and the cathode 22 of the SCR 18. The gate electrode 24 of the SCR 18 is coupled to the cathode 34 of a diode 36, whose anode 38 is coupled by means of a resistor 40 to a point of reference potential, such as ground.

A coupling capacitor 42 couples the anode 20 of the charging SCR 18 to the anode 12 of the input SCR 10. A print actuator coil 44 having a series resistance 46 (internal or external) is coupled between the cathode 22 of the charging SCR 18 and the anode 12 of the input SCR 10.

The cathode 14 of the input SCR 10 is coupled to a point of reference potential, such as ground. A diode 48, whose anode 50 is coupled to the cathode 14 of the input SCR 10, has its cathode 52 coupled to the gate electrode 16 of the input SCR 10.

A biasing resistor 54 is coupled between the gate electrode 16 of the input SCR 10 and a terminal 56 for receiving a negative bias voltage $V_b$. An input terminal 58, adapted to receive an input trigger signal, is coupled to the gate electrode 16 of the input SCR 10 by means of a coupling capacitor 60 and a current limiting resistor 62.

In operation, initially, both SCR's 10 and 18 are non-conducting. The capacitive means 30 is charged from the high voltage source +H.V., through the terminal 26, through the anode resistor 28, and the charging resistor 33, to an initial charge.

The application of an input pulse, applied to the input terminal 58, couples a positive signal to the gate electrode 16 of the input SCR 10, which positive signal causes the input SCR 10 to condut.

Conduction of the input SCR 10 causes the charge stored in the capacitive means 30 to discharge through the print actuator coil 44 and resistance 46 through the input SCR 10, thereby actuating the coil 44. This discharge through the print hammer actuator coil causes a character to be printed.

Due to the "Q" of the circuit, comprising the coil 44, resistance 46, and capacitive means 30, the voltage at the cathode 22 of the charging SCR 18 overshoots or "rings" negatively. This overshooting or "ringing" causes current to flow from the point of reference potential (ground), through the bias resistor 40 and diode 36 through the resistor 32. The current flow through the resistor 32 provides a voltage drop thereacross thereby applying a relatively positive voltage to the gate electrode 24 of the charging SCR 18, causing the charging SCR 18 to conduct.

Conduction of the charging SCR 18 causes the voltage at the anode 20 thereof to drop in value negatively. This voltage pulse is passed by means of the coupling capacitor 42 quenching the input SCR 10.

The capacitive means 30 is quickly charged through the anode resistor 28 and the charging SCR 18.

Subsequently, an input pulse applied to the input terminal 58 causes the following:

(1) Input pulse causes the input SCR 10 to conduct.

(2) A negative-going voltage pulse through the coupling capacitor 42 causes the charging SCR 18 to cease conduction.

(3) The capacitive means 30 discharges, through the print actuator coil 44, through the input SCR 10.

(4) The voltage at the cathode 22 of the charging SCR 18 overshoot or "rings" negatively.

(5) The diode 36 conducts, initiating conduction of the charging SCR 18.

(6) A negative voltage pulse, coupled through the coupling capacitor 42, causes conduction of the input SCR 10 to cease.

(7) The capacitive means 30 is recharged through the anode resistor 28 and SCR 18.

Various configurations and embodiments are possible. In accordance with one specific embodiment, the following values are typical:

| | | |
|---|---|---|
| Capacitor: | | |
| **60** | microfarads | 0.047 |
| **42** | do | 0.33 |
| **30** | do | 12 |
| Resistor: | | |
| **62** | ohms | 200 |
| **54** | do | 3,000 |
| Resistance: | | |
| **46** | do | 12 |
| **33** | do | 15,000 |
| **28** | do | 150 |
| **32** | do | 1,000 |
| **40** | do | 33 |
| Diode: | | |
| **48** | | EM 109 |
| **36** | | 1 N 4044 |
| SCR: | | |
| **10** | | Transitron Type 205C |
| **18** | | Transitron Type 205C |
| Bias voltage | volts | —8 |
| High voltage | do | +170 |

With the aforesaid circuit, as described, repetition rates in excess of 5,000 actuations per minute are theoretically possible. This figure is well in excess of the capabilities of contemporary mechanical printers. Hence, by practicing this invention, the speed of a printer is not limited by its actuating circuit.

Minor modifications can be performed by those ordinarily skilled in the art, without departing from the spirit and scope of this invention. For example, in a system having a plurality of actuator coils, a common capacitive means 30 can be used.

Other modifications will suggest themselves to those skilled in the art.

It is noted that the solenoid power amplifier described herein does not utilize any chokes or coils or bulky components and hence is suitable for mass production with miniaturization techniques.

The embodiments of the invention in which an exclusive property or privilege is claimed are defined as follows:

1. A combination comprising:
a first rectifier means having an anode and a cathode, and further having a gate electrode, said first rectifier means being adapted to block in the forward direction until a signal is applied to said gate electrode;
a second rectifier means having an anode and a cathode, and further having a gate electrode, said second rectifier means being adapted to block in the forward direction until a signal has been applied to said second gate electrode;
a first capacitive means coupled in serial relation with said first rectifier means;
an inductive load coupling said first capacitive means to said second rectifier means;
a second capacitive means coupling said rectifier means to each other;

means for providing a bias voltage to said gate electrode of said second rectifier means;
means for receiving an input signal, said receiving means coupled to said gate electrode of said second rectifier means; and
a bias circuit including a unilateral conducting means coupled to said first capacitive means, said gate electrode of said first rectifier means, and a point of reference potential.

2. The combination as claimed in claim 1 wherein each of said rectifier means is a silicon controlled rectifier (SCR).

3. The combination as claimed in claim 2 wherein
said first capacitive means is coupled between said cathode of said first SCR and said point of reference potential;
said inductive load is coupled between said cathode of said first SCR and said anode of said second SCR;
said second capacitive means is coupled between said anodes of said SCR's;
said cathode of said second SCR is coupled to said point of reference potential.

4. The combination as claimed in claim 3 further comprising:
means for receiving a positive potential source; and
an anode resistor coupling said potential source receiving means to said anode of said first SCR.

5. The combination as claimed in claim 4 further comprising a shunt resistor coupling said anode of said first SCR to said cathode of said SCR.

6. The combination as claimed in claim 5 wherein said bias circuit includes
a first resistor coupled between said cathode and said gate electrode of said first SCR; and
a serially connected second resistor and diode, the anodal portion of said serial connection being coupled to said point of reference potential, and the cathodic portion of said serial connection being coupled to said gate electrode of said first SCR.

7. The combination as claimed in claim 6 wherein said means for providing a bias voltage includes
means for receiving a negative voltage source;
a bias resistor coupling said negative voltage source receiving means to said gate electrode of said second SCR; and
a diode having an anode, and a cathode, said diode anode being coupled to said second SCR cathode, and said diode cathode being coupled to said second SCR gate electrode.

8. The combination as claimed in claim 7 further comprising a serially connected input capacitor and current limiting resistor coupling said input signal receiving means to said second SCR gate electrode.

References Cited

UNITED STATES PATENTS

| | | | |
|---|---|---|---|
| 3,179,818 | 4/1965 | Urban. | |
| 3,193,733 | 7/1965 | Orsino | 317—148.5 |
| 3,231,786 | 1/1966 | Felcheck | 317—148.5 |
| 3,295,421 | 1/1967 | McCormick | 317—148.5 X |

LEE T. HIX, *Primary Examiner.*